United States Patent [19]

Araujo et al.

[11] 4,125,405

[45] Nov. 14, 1978

[54] COLORED, DICHROIC, BIREFRINGENT GLASS ARTICLES PRODUCED BY OPTICAL ALTERATION OF ADDITIVELY-COLORED GLASSES CONTAINING SILVER AND SILVER HALIDES

[75] Inventors: Roger J. Araujo, Corning; Nicholas F. Borrelli, Elmira; Jan B. Chodak, Painted Post; George B. Hares, Corning; Gerald S. Meiling, Painted Post; Thomas P. Seward, III, Corning, all of N.Y.

[73] Assignee: Corning Glass Works, Corning, N.Y.

[21] Appl. No.: 739,205

[22] Filed: Nov. 5, 1976

[51] Int. Cl.$^2$ .................... C03C 3/10; C03C 3/08; C03C 3/30

[52] U.S. Cl. .................... 106/54; 106/52; 106/DIG. 6; 106/47 Q; 106/47 R; 106/53; 65/30 R

[58] Field of Search .......... 65/30 R; 96/90 CP, 94 R; 106/52, 54, DIG. 6, 47 Q, 47 R, 53

[56] References Cited

U.S. PATENT DOCUMENTS

| | | | |
|---|---|---|---|
| 3,208,860 | 9/1965 | Armistead et al. | 106/DIG. 6 |
| 3,540,793 | 11/1970 | Araujo et al. | 106/DIG. 6 |
| 3,734,754 | 5/1973 | Randall et al. | 106/DIG. 6 |
| 3,920,463 | 11/1975 | Simms | 106/DIG. 6 |
| 4,017,318 | 4/1977 | Pierson et al. | 106/DIG. 6 |
| 4,075,024 | 2/1978 | Armistead | 106/54 |

*Primary Examiner*—O. R. Vertiz
*Assistant Examiner*—Mark Bell
*Attorney, Agent, or Firm*—Kees van der Sterre; Clinton S. Janes, Jr.; Clarence R. Patty, Jr.

[57] ABSTRACT

The absorptive and refractive properties of additively colored glasses containing an absorptive metallic silver phase and a separated silver halide phase are altered by irradiating the colored glasses with visible light. Polarization effects and multicolored images can be produced.

16 Claims, 5 Drawing Figures

Fig. 1b
EFFECT OF ORANGE TREATING LIGHT

Fig. 1c
EFFECT OF RED TREATING LIGHT

COLORED, DICHROIC, BIREFRINGENT GLASS ARTICLES PRODUCED BY OPTICAL ALTERATION OF ADDITIVELY-COLORED GLASSES CONTAINING SILVER AND SILVER HALIDES

BACKGROUND OF THE INVENTION

The present invention is in the field of colored and polarizing glasses and is concerned with the optical treatment of colored glasses containing both metallic silver and silver halide phases to produce colored and optically anisotropic glasses.

The coloration of a glass by the metals gold, silver and copper has been known since ancient times. "Ruby" glasses were investigated as early as 1857 by M. Faraday, who concluded that the coloration therein resulted from the presence of minute particles of gold within the glass. Similarly, metallic silver and copper particles were known to yield, respectively, yellow and red colored glasses.

The staining of glasses by metals such as silver and copper is also a relatively old technique. Essentially, such staining involves exposing the glass surface to metal ions at temperatures sufficient to cause ion migration into the glass, usually in exchange for alkali metal ions present therein. Exposure to copper and silver ions typically involves the use of a molten salt bath or a suitable compound of the metal mixed with a carrier which can be sprayed or painted on the glass surface.

If the oxidation state of the glass is sufficiently reduced, or if the glass includes suitable low temperature reducing agents such as $Fe^{+2}$, $Sb^{+3}$ or $As^{+3}$, the exchanged copper or silver ions can be reduced to neutral atoms and caused to precipitate in the glass as colloidal metal particles. The precipitation process may or may not require a heat treatment step subsequent to the ion exchange treatment.

Stookey has recently demonstrated, in U.S. Pat. Nos. 2,515,936 and 2,515,943 that colloidal particles of silver, and gold may be photosensitively precipitated in glass to produce coloration. This process essentially involves photoreduction of atomic metal in selected volume regions of certain glasses, followed by heat treatment to develop the desired color.

In all of the above cases, precipitated colloidal metal particles are deemed to be the selective light-absorbing constituents which color the glass. In the case of metallic silver, the color observed is usually predominantly yellow or brown. The optical absorption of very small spherical silver colloids is characterized by a single, relatively sharp absorption peak in the violet, blue or green region of the visible spectrum. The exact location of the absorption peak, and the resulting glass color, depend primarily on the size of the silver colloids and upon the refractive index of the glass.

The conventional coloration effects of silver in glass can be considerably varied if, in addition to the glass matrix and the silver colloids, a third phase is present in the system. The observed effects are presumably due to the fact that the silver colloids in a three-phase system may be in or on the third phase as well as in the matrix glass. The existence of such systems and some of the properties observed therein are described by Forst and Kreidl in "Red Silver Glasses", *Journal of the American Ceramic Society*, Volume 25, Number 10, pages 278-280 (1942).

Another multi-phase system is described by W. H. Armistead in a copending, commonly assigned application, Ser. No. 715,989, filed Aug. 19, 1976, now U.S. Pat. No. 4,075,024. That system comprises silver-containing glasses exhibiting a wide range of transparent yellow, orange, red, blue and green colors. The glasses described are phase-separated glasses, and the wide range of colors observed therein is attributed to an unusual arrangement of silver particles at the interface between two glassy phases.

Certain of the unusual coloration effects found in silver-containing glasses may be due to the fact that the silver colloids present in the glass are non-spherical. The absorption behavior of non-spherical silver colloids is considerably more complex than that of spherical colloids. Thus the shape of the absorption curve of an elongated silver particle, such as an ellipsoid, depends not only on the size and degree of elongation of the particle, but also upon the nature of the incident light. Specifically, the absorbing properties of the particle depend on the degree of polarization of the incident light as well as the orientation of the particle with respect thereto.

To briefly review the phenomenon of light polarization, according to the wave theory, light is considered to propagate with its electric vector E perpendicular to the direction of propagation. Linearly polarized light is light whose characteristic E vector is oriented in a fixed direction in this perpendicular plane. The state of polarization of the light is characterized by the relationship of this fixed direction to some reference direction, e.g., vertical or horizontal polarization with respect to the horizon, or perpendicular or parallel polarization with respect to a given axis in the plane.

A beam of natural light consists of all polarizations. That is, the direction of the E vector varies randomly in the plane perpendicular to the direction of propagation. At any instant the E vector may be resolved into components perpendicular and parallel to a selected reference direction in this plane. If one of these components is selectively absorbed as the beam of light passes through a medium, the light that is transmitted through the medium is considered to be linearly polarized. A medium having this property of selective absorption is called a polarizer.

The more common polarizers are composed of plastics, but glasses which linearly polarize light are also known. These glasses are referred to as dichroic glasses, the term dichroic referring in this sense to the optical anisotropy of the glass with respect to its absorption coefficient $\alpha$. Thus the absorption of light passing through such a glass depends upon the direction of polarization of the light with respect to the glass.

Taking the specific case of light absorption by an ellipsoidal (prolate or oblate) metallic silver particle as an example, if the incident light is linearly polarized such that its E vector is parallel to the long axis of such a particle, the absorption maximum is shifted to a longer wavelength than for a corresponding spherical particle. On the other hand, the absorption maximum for light polarized with its E vector perpendicular to the long axis of the particle is shifted to shorter wavelengths. The extent of these shifts increases with the degree of elongation of the particle.

For a glass containing ellipsoidal metallic silver particles which are randomly oriented in space, the absorption curve exhibited by the glass would correspond to a weighted average of the absorption curves exhibited by a single particle taken over all possible orientations with respect to a beam of linearly polarized light. Hence the glass would be optically isotropic.

For a glass wherein the ellipsoidal metallic particles are aligned in a common direction, however, the absorption behavior of the glass is analogous to that of a single particle. Hence, a singly- or doubly-peaked absorption curve will be observed depending upon the degree of polarization of the incident light and the direction of polarization of that light with respect to the direction of alignment of the particles in the glass. The fact that, for polarized light, absorption varies considerably depending upon the direction of polarization, means that the glass is dichroic and can act as a polarizing medium.

The dichroic properties of stretched glasses containing elongated silver particles approximating prolate ellipsoids have been described by Stookey and Araujo in "Selective Polarization of Light Due to Absorption by Small Elongated Silver Particles in Glass", *Applied Optics,* Volume 7, Number 5, pages 777–779 (1968). Similar properties in stretched glasses comprising lead or gold have been reported by Land in U.S. Pat. No. 2,319,816.

Other glasses wherein metallic silver fulfills an important absorbing function are so-called photochromic glasses containing silver halides. These glasses, described by Armistead and Stookey in U.S. Pat. No. 3,208,860, comprise submicroscopic crystals of a silver halide such as silver chloride, silver bromide or silver iodide, and are typically colorless in the unactivated state. However, upon exposure to actinic radiation such as ultraviolet light, the glass darkens (becomes more absorbing with respect to visible light) to an extent which depends somewhat on the intensity of the actinic radiation employed. Upon termination of this radiation, the glasses return to the clear, non-absorbing state.

The behavior of these glasses is explained in terms of the photolytic reduction of silver ions in the silver halide crystals to metallic silver through the action of ultraviolet light. Specks of silver which absorb visible light are formed at the crystal sites. However, since the products of the photolytic reduction are trapped at these sites by the matrix glass, recombination to silver halides occurs when exposure to the actinic radiation is terminated.

Although the color of these photochromic glasses in the darkened state may vary, they are not generally colored in the clear or unactivated state. Thus recombination of metallic silver and halogen to form silver halide can be complete, whereupon no detectable residual metallic silver remains at the crystal sites to color the glass.

It is known that photochromic glasses of the silver halide type are bleachable to varying degrees by the action of visible light. That is, the conversion of these glasses from the darkened state (induced by irradiation with ultraviolet light) to the original clear, non-light absorbing state is accelerated by exposure to certain wavelengths of visible light. U.S. Pat. No. 3,630,765 to Araujo describes optically-bleachable photochromic glasses which are bleached by the action of red or near infrared radiation.

A family of silver-halide containing photochromic glasses exhibiting unusual darkening effects is disclosed by Randall and Seward in U.S. Pat. No. 3,734,754. Seward notes, in the Journal of Applied Physics, 46, 689 (1975), that red and purple colors are observed in these glasses which can be optically bleached, but redeveloped upon heating the glass. The coloration is tentatively attributed to the presence of silver metal in contact with the silver halide photochromic phase.

The use of polarized optical bleaching light to modify the light absorbing and light refracting properties of silver chloride photographic emulsions, sols and single crystals which have been chemically or optically darkened is described by Cameron and Taylor in "Photophysical Changes in Silver-Silver Chloride Systems", *Journal of the Optical Society of America,* 24, 316–330 (1934). These authors observed that two different effects were produced by irradiation with polarized bleaching light. The first effect, hereinafter referred to as photo-adaptation, involved a change in color caused by the action of the irradiating light, such that the photo-adapted material tended to assume the color of the light by which it was produced.

A second effect, hereinafter referred to as photoanisotropy, involved the appearance of anisotropic effects which included dichroism and birefringence. These are termed photo-dichroism and photo-birefringence.

For the purposes of the following description, the term photo-coloration will be employed to refer to all changes in color which occur upon irradiating a material with light, whether or not the coloration which results approximates that of the irradiating light. Hence, materials which exhibit coloration differing from that of the irradiating light will be discussed, as will materials exhibiting all of the so-called photo-alteration or optical-alteration effects above described.

The copending commonly-assigned application of Araujo et al., Ser. No. 739,122, concurrently filed herewith, describes photo-alteration treatments which can be used to modify the light absorbing and refracting properties of silver halide-containing photochromic glasses. In general, useful properties are obtained in accordance with those treatments by optically bleaching a photochromic glass while it is in an at least partially darkened (light-absorbing) state.

SUMMARY OF THE INVENTION

In accordance with the present invention, optical treatments are utilized to modify the light absorbing and refracting properties of glasses permanently colored by a metallic silver phase in interacting relationship with a silver halide phase. The silver halide phase is one comprising silver chloride, silver bromide, silver iodide, or mixtures thereof. Although the glass to be treated may be photochromic as well as permanently colored, there is no requirement that the glass be photochromic in order that the absorptive and refractive properties of the glass may be altered by optical treatments. Thus permanent optical alteration of non-photochromic as well as photochromic colored glasses may be accomplished in accordance with the invention.

Necessary conditions for susceptibility to optical treatment in accordance with the invention are that the glass contain both a precipitated silver halide phase and a coloring metallic silver phase. A glass containing a coloring metallic silver phase is a glass exhibiting absorption bands in the wavelength range of visible light, which bands are attributable to the presence of metallic silver therein.

A further requirement for treatment is that the metallic silver phase be capable of interacting with the precipitated silver halide phase in the presence of light. It is presently believed that this light-dependent interacting relationship requires that at least some of the metallic silver be sufficiently close to the silver halide phase so that electrons can be photoemitted from the metal to the halide phase. Although the exact nature and mechanism of the interaction has not yet been established, it is believed that silver ions also must diffuse into the silver halide phase. Regardless of the mechanism, we have found no colored glasses containing silver without halogens which are susceptible to optical alteration.

Glasses comprising the required phases in interacting relationship are hereinafter referred to as additively colored silver-silver halide containing glasses. The use of the term "additive coloration" finds current basis in the study of alkali halide crystals, being used to refer to coloration caused by the presence of alkali metal particles in the alkali halide crystal phase of the same metal. However its use in the present context is not intended to imply that the location of the silver particles with respect to the silver halide phase has been definitely established.

The underlying basis for the present invention is the discovery that the absorption characteristics of the described additively colored silver-silver halide containing glasses may be altered, at least in the wavelength range of visible light, by irradiating the glasses with light of a selected wavelength or range of wavelengths. The alteration resulting from irradiation usually involves a range of wavelengths which is substantially broader than the selected wavelength of light used to irradiate the glass, and which may encompass the entire visible region. Thus broad changes in the shape of the absorption curve for the glass can be produced, even using monochromatic irradiating light.

The absorption changes which are induced by optical treatment as herein described are relatively stable, i.e., they decay only very gradually with time. The effect most often observed as a result of treatment is a bleaching effect, such that the glass becomes less absorbing, upon irradiation with light of a selected wavelength, at least with respect to light of wavelengths near that of the irradiating light. However, increased absorption with respect to light near the wavelength of the treating light has also been induced.

The treatment of colored glasses in accordance with the present invention includes several important aspects. In one aspect, the invention comprise a method for modifying the color of an additively colored silver-silver halide containing glass article. This color modification essentially involves altering the absorption characteristics of the glass, at least with respect to visible light, by irradiating the glass with colored light. For the purpose of the present description, colored light is light consisting predominantly of only a limited range of light wavelengths in the visible spectrum. The observed color change may comprise photo-adaptation, i.e., the glass may take on the color of the treating light, or it may comprise photo-coloration, i.e., the glass may take on some color other than that of the treating light.

In a second important aspect, the invention involves the production of dichroic and birefringent glass articles by optically treating additively colored silver-silver halide containing glasses with polarized light. Thus the invention includes a method for producing a permanently colored, dichroic, birefringent glass article which comprises the step of irradiating an additively colored silver-silver halide containing glass with polarized light, as well as the dichroic birefringent, colored glass product which results from such treatment.

Dichroism in the colored product is manifested by anisotropy with respect to the absorption coefficient of the glass. At some wavelength in the range of visible light, the glass more strongly absorbs light polarized perpendicularly to the direction of polarization of the treating light than it does light polarized parallel thereto. This dichroism is wavelength dependent such that the considerable difference between the parallel and perpendicular absorption coefficients which may be observed with light near the treating wavelengths may disappear at shorter wavelengths and reverse at very short wavelengths. Essentially, then, these glasses exhibit dichroism which is analogous to that observed by Stookey and Araujo for stretched glasses containing metallic silver. However their production does not require the use of high temperature stretching treatments, nor is the polarization direction necessarily confined to a single axis (the stretch axis) of the glass as in the prior art.

The mechanism by which optical anisotropy and color adaptation are induced by the optical treatment of additively colored silver-silver halide containing glasses in accordance with the invention has not been completely established. Nevertheless the following postulated mechanism is proposed as an aid to understanding and as a possible explanation of some of the effects observed. This explanation is tentative only and is not to be taken as limiting the scope of the invention defined by the appended claims.

It has been suggested that at least some of the additive coloration in silver-silver halide glasses is due to the presence of somewhat anisotropically-shaped aggregates of silver atoms randomly arranged in or close to the particles comprising the precipitated silver halide phase. Stronger absorption of light, and thus preferential optical bleaching, occurs when the electric vector of the treating light is parallel to a particular axis of the silver aggregate. Hence, if linearly polarized treating light is used, the silver aggregates are selectively affected, the array of aggregates is no longer random in direction, and a polarizing material results.

Figure 1A:
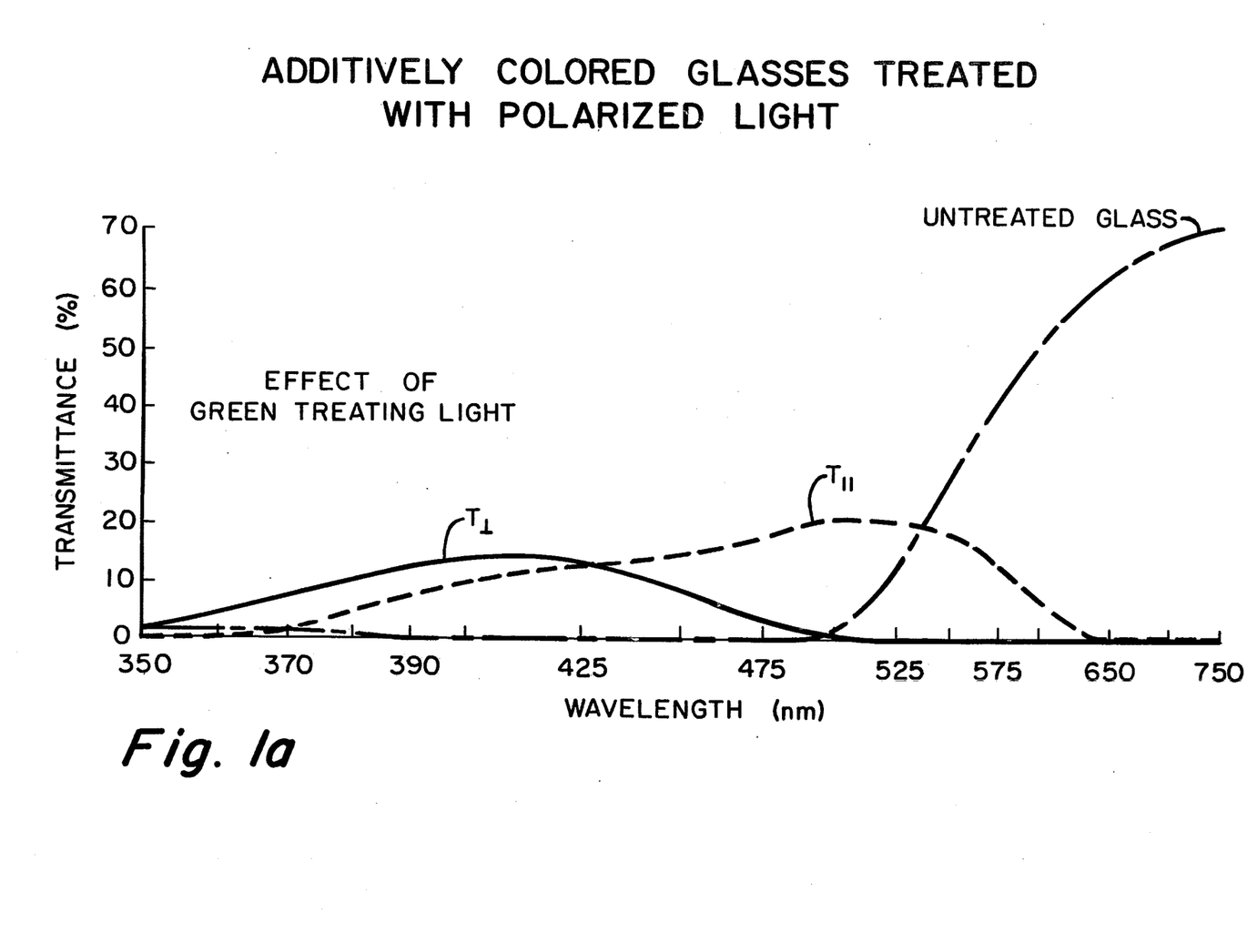
FIGS. 1a–1c of the drawing consist of a series of spectrophotometer curves plotting transmittance as a function of wavelength for an additively colored silver-silver halide glass before and after treatment with polarized light in accordance with the invention.
Figure 1B:
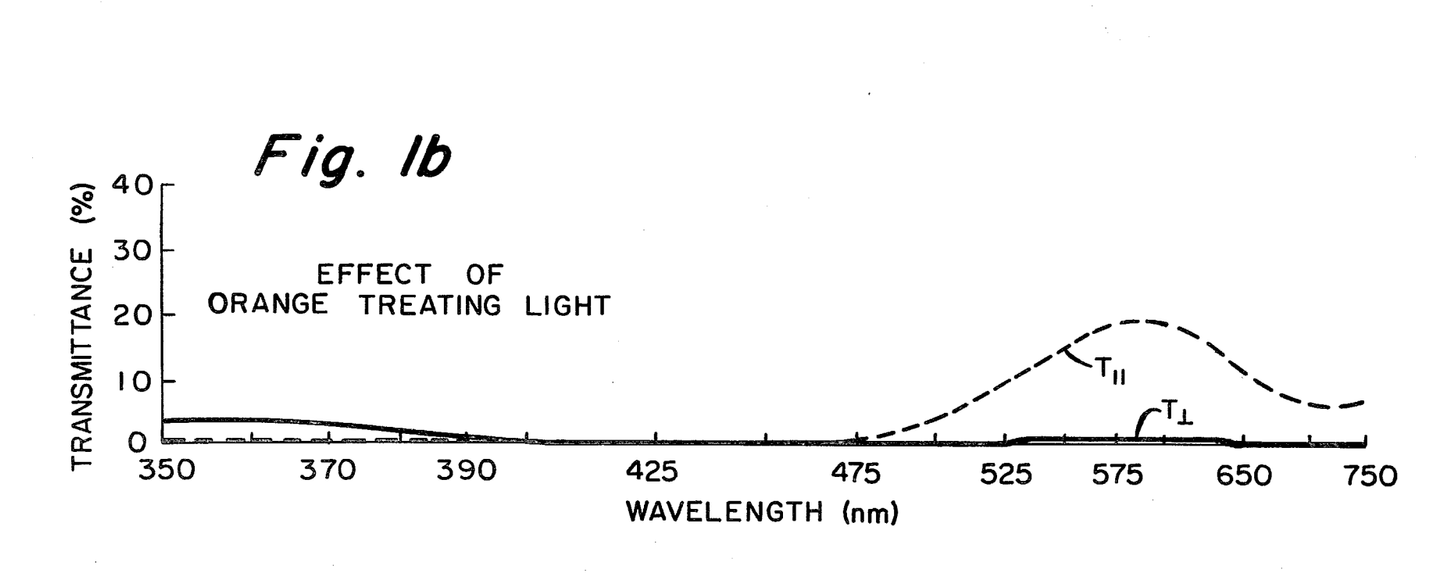
Figure 1C:
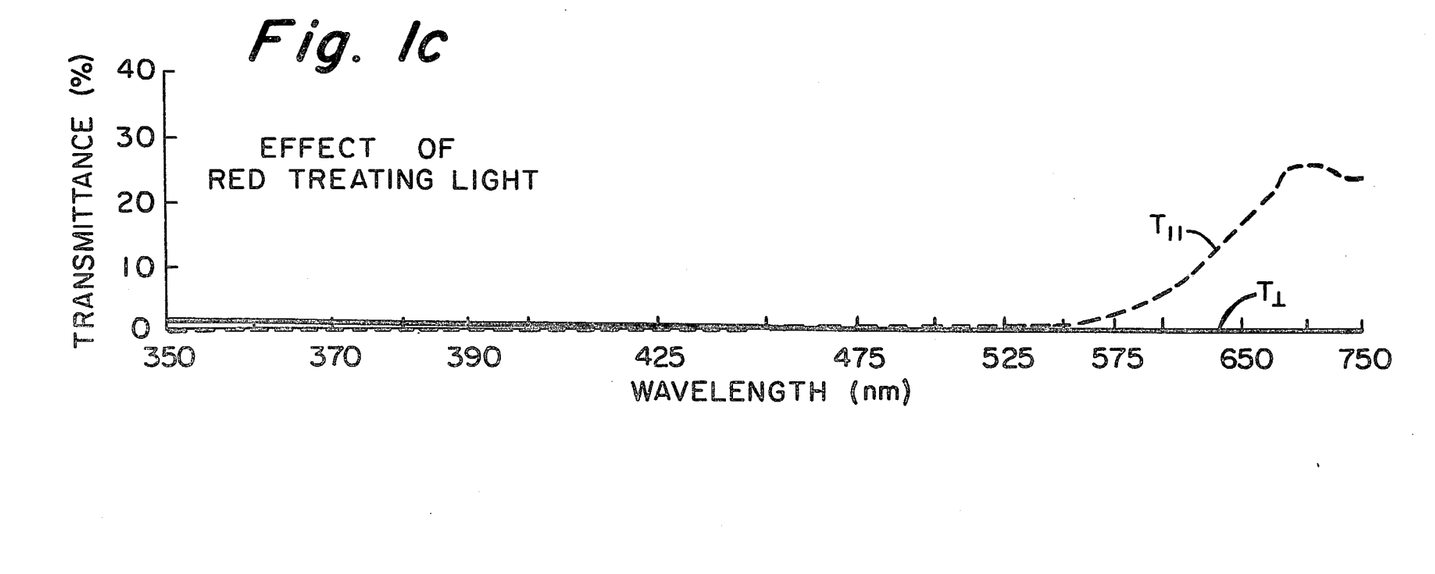
Figures 2A, 2B:
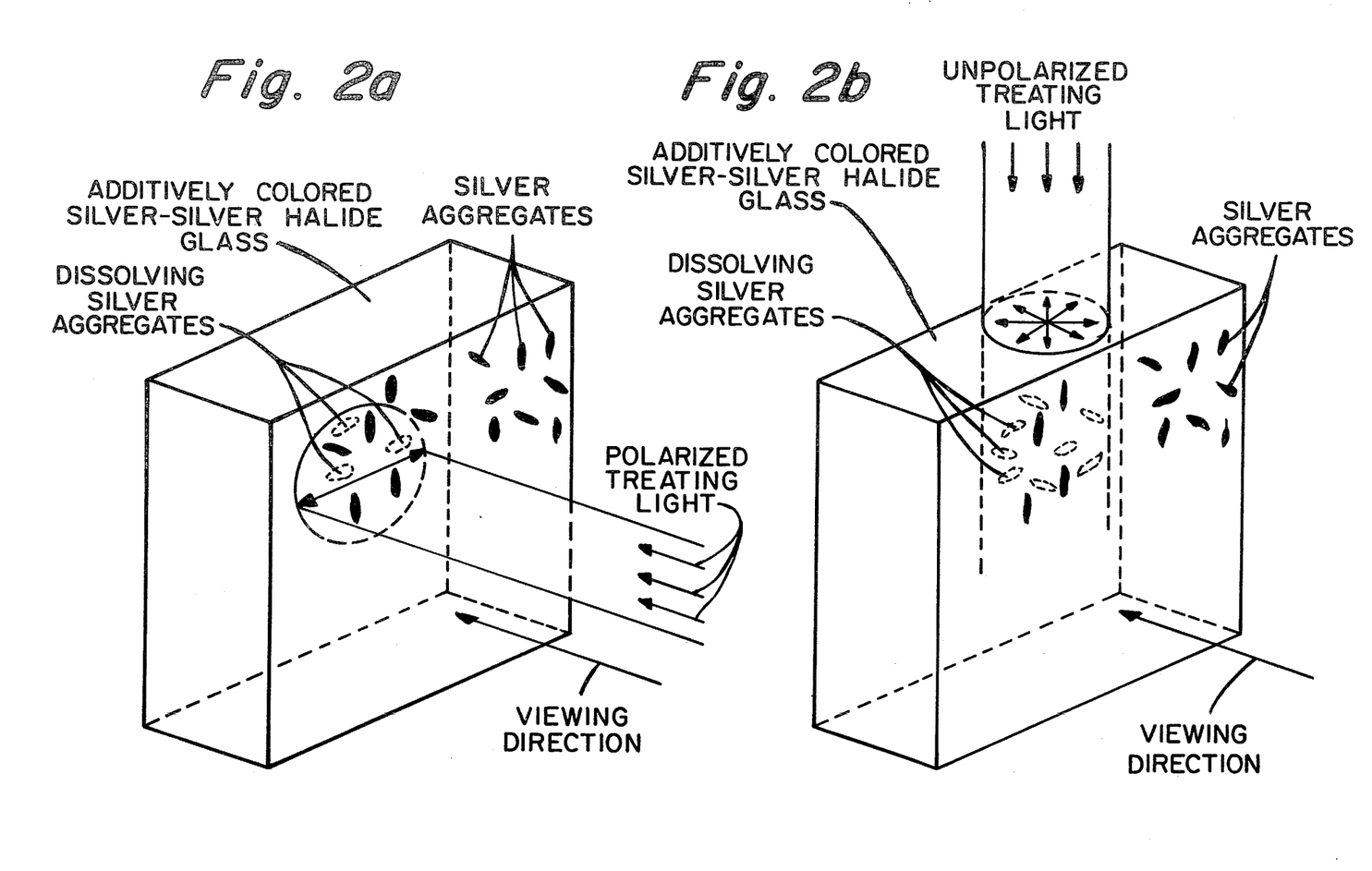
FIG. 2a is a schematic perspective view of an article composed of an additively colored silver-silver halide containing glass exposed in part to a beam of polarized treating light. The treating light is polarized in a horizontal direction as shown by the double arrow on the surface of the glass representing the plane of the electric vector of the impinging polarized light. The glass comprises a multiplicity of randomly-oriented silver aggregates shown as dark segments, each of which is deemed to be in or close to a silver halide-containing particle (not shown).
FIG. 2b of the drawing is a schematic perspective view of an article composed of an additively colored silver-silver halide containing glass as in FIG. 2a, wherein the randomly-oriented silver aggregates are again depicted as dark segments which are deemed to be near silver halide-containing particles (not shown). The glass is exposed in part to a vertical beam of unpolarized treating light, the electric vectors of the impinging light being randomly disposed in a horizontal plane as shown by the arrows at the glass surface.

The above-described effect of preferential bleaching is schematically illustrated in FIG. 2a of the drawing, wherein an article composed of an additively colored silver-silver halide glass comprising a multiplicity of randomly-oriented silver aggregates, depicted as dark segments, is represented. Each of the aggregates depicted is deemed to be close to a particle comprising silver halide, (not shown). In the region of glass irradiated by the beam of linearly polarized treating light, preferential destruction of silver aggregates of appropriate size aligned in a direction parallel to the direction of polarization of the light (shown by the double arrow) will occur. The dissolving aggregates are represented by dashed segments.

The aggregates remaining after preferential bleaching are not randomly oriented in a plane perpendicular to the direction of travel of the treating light. Thus is can be seen that a beam of non-polarized light traversing the glass in a viewing direction paralleling the direction of the treating light will be rendered polarized by the selective action of the remaining aggregates.

Of course, it will be apparent from the foregoing that treating with unpolarized light can also cause optical anisotropy which will polarize any second beam of light subsequently traversing the glass in a direction differing from that of the bleaching light. Thus if one irradiates an additively colored silver-silver halide containing glass with unpolarized light from a direction, for example, transverse to that of the viewing direction, a definite dichroic effect may thereafter be observed by the viewer.

The effects of such irradiation are illustrated in FIG. 2b of the drawing, wherein a vertical beam of unpolarized treating light traversing an article composed of an additively colored silver-silver halide glass is shown to preferentially bleach silver aggregates of appropriate size aligned in horizontal planes in the glass. Again, each aggregate is deemed to be close to a particle comprising silver halide (not shown). The non-random orientation of the remaining aggregates with respect to the viewing direction is evident. This distribution of silver aggregates would be expected to produce a dichroic effect, and we have in fact experimentally observed such an effect.

Obviously, the physical processes involved in this technique are essentially identical to the processes which occur utilizing linearly polarized light, although the treating light used for the technique is not linearly polarized in the conventional sense. Thus, since the electric vectors of the treating light lie in horizontal planes with reference to the viewing direction, the anisotropic effects observed by the viewer are analogous to those which would be produced by horizontally polarized treating light entering the glass from the viewing direction. For this reason, such techniques are deemed to be equivalent to irradiation with linearly polarized treating light as herein described, to the extent utilized to provide optically anisotropic glasses in accordance with the invention.

It is apparent from the foregoing description that dichroic birefringent glass articles provided in accordance with the invention, because they are not produced by stretching processes, are structurally different from the stretched polarizing glasses of the prior art. Hence the particles constituting or comprising the precipitated silver halide phase are typically not elongated (e.g. they usually have aspect ratios below 2:1), and even if somewhat elongated, they are in all cases randomly oriented. Thus the silver halide phase has no discernible preferential alignment.

It will of course be appreciated that glass articles wherein the additive coloration is confined to a particular region may be treated in accordance with the invention to produce photo-alteration in that region or any portion thereof. Examples include silver-stained glasses wherein the additive coloration may be confined to surface regions of the article. Similarly, the optical treatment itself may be confined to selected regions of an additively colored article to provide areas of varying color or anisotropy therein.

Through the use of the above-described optical treatments, multicolored glass articles of a single composition as well as fixed-tint glass articles exhibiting light-polarizing capabilities may be provided. As previously noted, the optically-induced absorption shifts provided in accordance with the invention are relatively stable, decaying only slowly with time. The glass product is therefore expected to find use as a polarizing sunglass, as well as for information storage and display and a variety of other technical and consumer-related applications.

DESCRIPTION OF THE DRAWING

FIG. 1a plots the light transmittance of a glass sample prior to optical treatment (untreated glass) and after treatment with predominantly green polarized laser light to modify the color and polarizing characteristics thereof. Two components of transmittance by the treated glass are shown: transmittance with respect to light polarized parallel to the direction of polarization of the green laser treating light (curve $T_{11}$), and transmittance with respect to light polarized perpendicularly thereto (curve $T_1$).

FIG. 1b plots the light transmittance of a glass sample having the same untreated transmittance curve as the glass shown in FIG. 1a, but after treatment with polarized orange light. Again two components of transmittance by the treated glass are shown: transmittance with respect to light polarized parallel (curve $T_{11}$) and perpendicular (curve $T_1$) to the direction of polarization of the orange treating light.

FIG. 1c plots the light transmittance of still another glass sample having an untreated transmittance curve corresponding to that of the glass shown in FIG. 1a, but after treatment with red polarized laser light. Again two components of transmittance by the treated glass are shown: transmittance with respect to light polarized parallel (curve $T_{11}$) and perpendicular (curve $T_1$) to the direction of polarization of the green treating light.

FIGS. 2a and 2b of the drawing consist of two schematic illustrations of a possible mechanism by which photo-alteration might occur in additively colored silver-silver halide glasses treated according to the invention.

In the region of the glass intersected by the polarized treating light, preferential destruction of silver aggregates of appropriate size aligned in a direction parallel to the direction of polarization of the treating light occurs. The dissolving silver aggregates are shown as dashed segments. The silver aggregates remaining in the treated region exhibit non-random orientation as seen from the indicated viewing direction, and thus selectively absorb and polarize light parallel to the viewing direction which subsequently traverses the treated region of the glass.

Although the treating light is not linearly polarized, preferential destruction of silver aggregates of appropriate size which lie parallel to horizontal planes in the glass (perpendicular to the direction of propagation of the bleaching light) occurs, because the electric vectors of the treating light are all horizontally directed. The dissolving aggregates are represented by dashed segments.

The aggregates remaining after preferential bleaching exhibit non-random orientation when viewed from a direction other than the direction of the treating light, for example, from the viewing direction shown. Thus light traversing the glass in the indicated viewing direction is selectively absorbed and polarized.

DETAILED DESCRIPTION

Additively colored silver-silver halide containing glasses which are optically alterable in accordance with the present invention may be prepared by any of a wide variety of techniques from glasses which, aside from additive coloration, appear quite different. For purposes of illustration, however, and without intending to limit the scope of the present invention, four specific types of glasses may be cited. These are phase-separated borosilicate glasses, thermally darkenable photochromic glasses, reduced silver halide-containing glasses, and silver-stained photochromic glasses.

Examples of additively colored phase-separated borosilicate glasses are the glasses described in the aforementioned copending, commonly-assigned application of Armistead, Ser. No. 715,989, filed Aug. 19, 1976, now U.S. Pat. No. 4,075,024. That application is expressly incorporated herein for a complete description of methods for making glasses of this type.

As noted in that application, additively colored phase-separated borosilicate glasses are typically transparent, non-photochromic glasses exhibiting a wide range of yellow, orange, red, blue and green colors. This range of colors, which is unusually broad for a silver-containing glass, is attributed to the glass-glass phase separation induced by the heat treatment required for color development. The colors are very sensitive to heat treatment time and temperature. It should be noted that because heating is required to develop color in these glasses, multi-colored regions of arbitrary pattern cannot be provided therein due to the impossibility of controlling glass temperature on an arbitrary basis.

Examples of additively colored thermally-darkenable photochromic glasses are described in the aforementioned U.S. Pat. No. 3,734,754 to Randall and Seward.

These glasses are strongly photochromic in the normal sense, but in addition show an additive coloration unusual for photochromic glass. At temperatures below about 450° C., the glass acquires a definite color which is determined by the temperature to which it is heated. The color is drastically altered by heating at or above the melting point of silver halide ($\sim$455° C. for AgCl), but below that temperature the colored (thermally darkened) glass is optically alterable by treatment with selected wavelengths of visible light.

Reduced silver halide glasses are glasses containing a silver halide phase which are formulated, melted or otherwise treated under reducing conditions to cause the formation of a metallic silver phase in the glass. These glasses may or may not be photochromic depending upon their composition. The color imparted by the presence of metallic silver tends to be pink, red or brown, as exemplified by the non-photochromic silver-red glasses described in the aforementioned publication of Forst and Kreidl. This additive color is attributed to the presence of small aggregates of silver in a matrix of higher refractive index than the glass (e.g., AgCl, for which $n = 2.1$).

Silver-stained photochromic glasses are produced by silver staining alkali metal-containing silver halide photochromic glasses. The silver staining process, which may be conventional, produces an additive coloration similar to that exhibited by the reduced silver halide glasses above described. The color is confined to the strained surface of the glass, and can be modified by subsequent heat treatment. Purple, red, orange, brown and green additive colors may be obtained in this manner.

Specific examples of representative compositions for additively colored glasses of the above-described types are reported below in Table I. The compositions are reported in parts by weight on the oxide basis as calculated from the batches for each glass, except for silver and the halogens which are reported on an elemental basis in accordance with conventional practice.

In general, glasses of the types exemplified in Table I may be provided in accordance with well known glass manufacturing techniques. Batches for each glass may be compounded from conventional glass batch constituents, including oxides or other compounds which are thermally decomposable to the specified oxides or elements at the temperatures utilized for melting the batch. The batches may be melted in pots, tanks, crucibles or other melting units at suitable temperatures and thereafter formed into glass articles by processes such as pressing, rolling, drawing or spinning at viscosities suitable for the selected process.

TABLE I

| Composition No. | Compositions for Additively Colored Silver-Silver Halide Glasses) | | | | | | | | | | | | | | | |
|---|---|---|---|---|---|---|---|---|---|---|---|---|---|---|---|---|
| | Phase Separable Borosilicates | | Silver Stainable Photochromic Glasses | | | | Thermally Darkenable Photochromic Glasses | | | | | Reduced Silver Halide Glasses | | | | |
| | 1 | 2 | 3 | 4 | 5 | 6 | 7 | 8 | 9 | 10 | 11 | 12 | 13 | 14 | 15 | 16 |
| $SiO_2$ | 65.0 | 67.5 | 65.4 | 46.5 | 54.9 | 59.9 | | | | | | 44.9 | 46.8 | 60.4 | 69.9 | 70.8 |
| $B_2O_3$ | 15.0 | 20.0 | 12.8 | 6.8 | 15.8 | 17.6 | 23.3 | 23.7 | 17.2 | 24.4 | 67.7 | 11.5 | 8.9 | 15.8 | 14.7 | 14.8 |
| $La_2O_3$ | | | | | | | 48.0 | 48.3 | 56.3 | 49.3 | | | | | | |
| $Al_2O_3$ | | | 8.3 | 1.3 | 8.9 | 11.7 | 1.0 | 2.7 | 0.8 | 0.4 | 3.1 | 3.9 | 4.1 | 7.9 | 4.7 | |
| MgO | | | | | | | | | | | | | | | | |
| CaO | | | | | | | | | | 29.2 | | | | | | |
| SrO | | | | | | | | | | | | | | | | |
| BaO | | | | | 7.1 | | | | | | | | | | | |
| ZnO | | 5.0 | | | | | | | | | | | | | | |
| CdO | | | | | | | 1.0 | 0.6 | 1.1 | | | 1.4 | 1.5 | 1.9 | | |
| PbO | 12.0 | | | | 4.9 | | | | | | | | | | 5.6 | |
| $Li_2O$ | | | 3.9 | 2.7 | 2.6 | 3.0 | | | | | | 2.8 | 2.9 | 3.7 | | |
| $Na_2O$ | 6.0 | 5.0 | 8.7 | 5.8 | 1.7 | 6.6 | 0.7 | | | | | 5.6 | 5.8 | 7.7 | 4.0 | |
| $K_2O$ | | | | | | | | | | | | 1.0 | 0.3 | 0.4 | | 13.2 |
| $TiO_2$ | | | | | | | | | | | | | | | | |

TABLE I-continued

| | Compositions for Additively Colored Silver-Silver Halide Glasses | | | | | | | | | | | | | | | |
|---|---|---|---|---|---|---|---|---|---|---|---|---|---|---|---|---|
| | Phase Separable Borosilicates | | Silver Stainable Photochromic Glasses | | | | Thermally Darkenable Photochromic Glasses | | | | | Reduced Silver Halide Glasses | | | | |
| Composition No. | 1 | 2 | 3 | 4 | 5 | 6 | 7 | 8 | 9 | 10 | 11 | 12 | 13 | 14 | 15 | 16 |
| $ZrO_2$ | | | | | 2.3 | | | | | | | | | | | |
| $Ta_2O_5$ | | | | 36.3 | | | 24.0 | 24.1 | 24.6 | 24.6 | | 28.8 | 30.0 | | | |
| $As_2O_3$ | | | | | | | | | | | | 0.12 | 0.13 | 0.20 | | |
| $SnO_2/SnO$ | | | | | | | | | | | | | | | | |
| $Sb_2O_3$ | 2.0 | 2.0 | | | | | | | | | | | | | | |
| Ag | 0.50 | 0.46 | 0.54 | 0.43 | 0.49 | 0.23 | 0.77 | 1.02 | 0.77 | 1.25 | 1.98 | 0.36 | 0.37 | 0.48 | 1.02 | 0.95 |
| $CuO/Cu_2O$ | | | 0.26 | 0.092 | 1.30 | 1.00 | 0.03 | 0.03 | 0.03 | 0.03 | 0.03 | 0.27 | 0.28 | 0.37 | 0.03 | 0.03 |
| Cl | 0.15 | 0.19 | 0.72 0.48 | 0.48 | 0.68 | 0.48 | 0.24 | 0.60 | 0.26 | 3.92 | 0.45 | 0.47 | 0.59 | 1.05 | 0.95 | |
| Br | | | 0.13 | 0.13 | | | | | | | | 0.03 | 0.03 | 0.05 | | |
| F | | | 0.04 | | 0.30 | 0.24 | 0.79 | 0.55 | 0.48 | | | 0.38 | 0.40 | 0.49 | | |

Even glass compositions such as described above which comprise all of the silver, halogen and other constituents necessary for additive coloration may not be colored as formed from the melt. Unless the concentrations of silver and the halogens are very high or the glass is cooled slowly, these constituents remain dissolved in the glass and little or no additive coloration is then observed.

The development of a silver halide phase in such glasses is accomplished by heat treating the formed glass article, suitably at a temperature between the strain and softening point of the glass for times in the range of about ¼–16 hours. In the case of the phase-separable borosilicate, thermally darkenable photochromic, and reduced silver halide glasses, such heat treatments are normally sufficient to provide optically alterable additive coloration without further processing. Of course, subsequent silver staining steps are used to impart additive coloration to silver stained photochromic glasses, as will hereinafter more fully appear.

The heat treating techniques which are used to impart additive coloration or develop a separated silver halide phase in these glasses are conventional. As is well known, phase separation processes in such glasses are time and temperature dependent so that, at lower temperatures, longer times are required to develop the desired separation or coloration, and vice versa. Some examples of representative heat treatments which may be used to treat glass compositions such as shown above in Table I are reported below in Table II. The single conventional annealing treatment shown in Table II involved slow cooling from the annealing temperature; the remaining treatments comprised holding intervals for specified periods of time at the indicated temperatures.

TABLE II

Phase Separation Heat Treatments

| | |
|---|---|
| A | 550° C. - annealing treatment |
| B | 550° C. - ½ hour hold |
| C | 550° C. - 1 ½ hour hold |
| D | 550° C. - 3 hours hold |
| E | 550° C. - 17 hours hold |
| F | 600° C. - ½ hour hold |
| G | 640° C. - 1 hour hold |
| H | 650° C. - ½ hour hold |
| I | 650° C. - 1 hour hold |
| J | 650° C. - 2 hours hold |
| K | 650° C. - 5 hours hold |
| L | 750° C. - 1 hour hold |
| M | 800° C. - 1 hour hold |

Of course, both glass composition and heat treatment affect somewhat the photo-alteration characteristics of additively colored silver-silver halide glasses. Unfortunately the number of composition and heat treatment variables involved is so large that fundamental rules for predicting the extent of photo-alteration in specific cases are difficult to establish.

Factors tending to affect induced optical anisotropy include not only chemical changes during melting and the heat treatment used to precipitate the silver metal and silver halide phases, but also subsequent heat treatments which may affect the structure and arrangement of the combined phases. High energy irradiation, of course, may also change photo-dichroic and photo-coloration behavior.

Additive coloration in glasses of the phase separable borosilicate type, as described in the aforementioned Armistead et al. application, is particularly dependent upon the time of the heat treatment. The oxidation state of the glass is also a factor which affects the coloring characteristics of the product.

The additive color of thermally darkenable photochromic glasses may be intensified by low temperature heating after phase separation, and also is affected by the oxidation state of the glass and the ratio of silver to halide therein. Prolonged irradiation with treating light tens to bleach out the thermally induced additive coloration, and if the additive color is fully lost, photo-dichroism and photo-coloration will disappear. However, we have found that a post-separation heat treatment, subsequent to the initial phase separation step but prior to optical treatment, can provide a more intensely colored product wherein the tendency toward both thermal redarkening and complete bleaching is reduced. This improves the stability of the optically altered glass.

Post-separation heat treatments are usually carried out at temperatures lower than the temperature at which the silver halide phase was precipitated. Examples of post-separation heat treatments which may be employed are set forth in Table III below, which records a treatment temperature and a holding interval at that temperature for each of several different treatments.

TABLE III

Post-Separation Heat Treatments

| | |
|---|---|
| A | 400° C. - 16 hours hold |
| B | 470° C. - ½ hour hold |
| C | 475° C. - 4 hours hold |
| D | 570° C. - ½ hour hold |
| E | 575° C. - ½ hour hold |
| F | 600° C. - ½ hour hold |
| G | 620° C. - ½ hour hold |

Reduced silver halide glasses depend for their additive coloration on a coprecipitation of metallic silver (reduced silver) and silver halide (ionic silver), and hence require a moderate degree of reduction in their preparation as well as control over that state of reduction through the heat treating step of manufacture.

Many techniques for providing reduced glasses are known, but the best additive color for photo-alteration in accordance with the present invention is provided by promoting reducing conditions during melting, or by the incorporation of low-temperature reducing agents (polyvalent oxides such as $As_2O_3$, $SnO_2$, SnO, $Sb_2O_3$, $Bi_2O_3$, $CeO_2$, $SeO_2$ or the like) in the batch.

Reducing conditions which are especially effective in producing a metallic silver phase during melting are provided by using low nitrate levels in the batch, fast heating rates for melting, and relatively high melting temperatures (e.g., 1450° C. or greater). Compositional factors favoring a reduced glass product include low copper levels and a high silver:halogen ratio.

A balanced oxidation state wherein, upon forming or during heat treatment, the glass is neither so highly reduced that only metallic silver is produced nor so oxidized that only silver halide appears, is rather sensitive in some systems and may at first be somewhat difficult to obtain. For example, some reduced silver halide glasses are colored red as made, but become relatively colorless and strongly photochromic upon mild heat treatment. This suggests that the state of reduction of silver metal is somewhat unstable, and that halogen in a quantity sufficient to combine with the metal to form silver halide is present in the glass. Measures to reduce the oxidation state of the glass would then be indicated.

Although we have found it convenient to control the oxidation state of the glass by controlling melting conditions or using low temperature reducing agents, it will be recognized that other prior art methods for exercising this control may alternatively be employed. Thus heat treatment of the glass product under reducing conditions, for example, might in some cases provide a useful means for developing additive coloration in silver halide-containing glasses.

Ion exchange processes to introduce metallic silver into the glass for present purposes primarily employ glasses already comprising some silver halides, preferably in the form of a precipitated silver halide phase. Glasses of this type are well known and are exemplified by many of the photochromic glasses wherein photochromism is due to the presence of silver halide crystallites.

Good candidates for silver ion exchange treatments are usually glasses which contain some alkali which can exchange for the silver to be introduced into the glass. Also, as is well known, it is helpful if the glass is in a reduced condition and/or contains a low temperature reducing agent such as $Fe^{+3}$, $Sb^{+3}$, $Cu^{+1}$ or $As^{+3}$ in order to promote the reduction of silver ions entering the glass to silver metal.

Following ion-exchange, a heat treatment at temperatures below the softening point of the glass is often useful to convert ion-exchanged silver to the metallic state. Also, we have found that the presence of CuO, a constituent which is normally present in silver halide photochromic glasses to promote the photochromic effect, substantially improves the silver-stainability of photochromic glasses.

The silver staining of a selected photochromic glass can be carried out using conventional silver-staining techniques involving exposure of the glass surface to silver ions. Convenient temperatures lie in the 150°–400° C. range. The silver ions may be provided by a molten salt bath comprising a silver salt such as silver nitrate, or by a compound of silver such as silver oxide, silver sulphide, silver carbonate or the like, mixed with a carrier such as clay or ochre and applied to the glass surface. Our preferred practice is to immerse the glass in a molten salt bath consisting of 36% $AgNO_3$ and 64% $NaNO_3$ by weight at 280° C. for a time interval ranging from several hours to several days, depending upon the depth of layer and coloration desired. This is the practice which is followed in treating the stainable compositions shown in Table I above for the purposes of the examples illustrating the treatment of additively colored glasses hereinafter set forth.

Following the introduction of metallic silver into the glass by ion-exchange, full development of additive color or modification of the additive color first provided may be accomplished by a developing heat treatment at a temperature between about 150° C. and the glass softening point. Post-separation heat treatments such as the treatments shown above in Table III may be used for this purpose.

Successful silver staining to provide a glass having a metallic silver phase associated with a silver halide phase is normally shown by the colors which are observed following ion exchange and optional heat treatment. Whereas silver-stained glasses of low or intermediate refractive index are normally yellow, brown or red-brown, it is found that, in glasses wherein the metallic silver is in association with a precipitated silver halide phase, purple, red, orange, yellow or even green colors may be observed.

From the foregoing description it can be seen that additively colored silver-silver halide glasses which may be treated in accordance with invention include a wide range of diverse glasses all of which contain separated phases wherein both a silver halide and excess metallic silver are present. However, it will be appreciated that additively colored silver-silver halide glass types other than those specifically referred to above may also be treated as herein described. It will also be understood that the suitability of any such additively colored glass for treatment in accordance with the invention can readily be ascertained by irradiating the glass with light of a selected wavelength. The effectiveness of this irradiation to modify the transparency of the glass with respect to light of that or another wavelength can then be simply determined according to known practice.

The wavelength of the light utilized to induce modified absorption behavior in the glass is not critical; in fact, we have found that the optimum wavelength often depends upon the particular glass selected for treatment. However, most of the glasses we have studied are more readily altered with visible light of long or intermediate wavelength (red or green light) than with light of short wavelength.

The relative extent of photo-alteration produced in a given glass depends largely upon the power of the light source used to provide the irradiating light; more pronounced alteration effects are generally obtained if a powerful source of treating light is used. Among the sources of treating light which may be employed are lasers, xenon-mercury arc lamps, tungsten-halogen lamps, and sunlight. These are of course merely illustrative of the kinds of light sources which may be employed for this purpose.

The selection of a wavelength or group of wavelengths from a broad-band light source for use as colored irradiating light may be accomplished with interference filters or a combination of absorption filters. Polarization of the irradiating light to induce the photoanisotropic effects of photo-dichoroism and photo-birefringence in the glass may be accomplished with crystal polarizers, commercial plastic polarizers, or a Brewster angle pile of plates. Alternatively, a polarized laser source may be used.

Specific examples of optical treatments useful for the photo-alteration of additively colored silver-silver halide glasses as hereinabove described are set forth in Table IV below. Included in Table IV are a light source description as well as color, power, spot size and exposure interval data for each of several specific irradiating treatments. The polarization state of the irradiating light is also reported, as are the predominant wavelength(s) of the light emitted by the various laser sources employed.

TABLE IV

| | Optical Treatments | | | | | |
|---|---|---|---|---|---|---|
| | Light Source | Polarization State | Color | Power | Spot Size | Exposure Time |
| A | Tungsten Halogen lamp | Non-polarized | Red (filtered) | 150 watt | 5 cm. | 15 min. |
| B | " | " | Green (filtered) | " | " | " |
| C | " | " | Blue (filtered) | " | " | " |
| D | Hg-Xe Arc Lamp | " | Red (filtered) | 1000 watt | 3 mm. | 15 min. |
| E | " | " | " | " | 5 mm. | 15 min. |
| F | " | " | Yellow (filtered) | " | 1.5 cm | 15 min. |
| G | " | " | Green (filtered) | " | " | " |
| H | " | " | Blue (filtered) | " | " | " |
| I | He-Ne Laser | Polarized | Red (633 nm) | 20 mw | 3 mm | 1 min. |
| J | " | " | " | " | " | 1.5 min. |
| K | " | " | " | " | " | 3 min. |
| L | " | " | " | " | " | 5 min. |
| M | " | " | " | " | " | 1 hour |
| N | " | " | " | " | 5 mm. | 1.5 min. |
| O | " | " | " | " | 6 mm. | 1.5 min. |
| P | " | " | " | " | 8 mm. | 1.5 min. |
| Q | " | " | " | " | 1 cm. | 15 min. |
| R | " | " | " | " | " | 1 hour |
| S | Krypton Laser | " | Red (647, 676 nm) | 700 mw | 0.5 mm | 15 sec. |
| T | " | " | " | " | 1 cm | 15 min. |
| U | " | " | Green (531 nm) | 200 mw | 3 mm | 3 min. |
| V | " | " | " | " | 5 mm | 1.5 min. |
| W | " | " | " | " | 1 cm | 15 min. |
| X | " | " | Yellow (568 nm) | 200 mw | 3 mm | 3 min. |
| Y | " | " | " | " | 1 cm | 15 min. |
| Z | " | " | Broad Green (480, 531, 570 nm) | 600 mw | 0.5 mm | 5 sec. |
| AA | " | " | " | " | 3 mm | 15 sec. |
| BB | " | " | " | " | 3 mm | 5 min. |
| CC | " | " | " | " | 8 mm | 1.5 min. |
| DD | " | " | " | " | 8 mm | 15 min. |
| EE | " | " | " | " | 1 cm | 15 min. |

The polarizing properties of dichroic additively colored glasses provided in accordance with the invention are found to be wavelength dependent. If the transmittance spectrum of the glass is measured with respect to light having an electric vector parallel to that of the treating light and is compared with the transmittance spectrum measured with respect to light of the opposite (perpendicular) polarization, generally the parallel transmittance is higher at longer (green, yellow, orange and red) wavelengths, about equal at shorter (blue) wavelengths, and lower at the shortest (violet) wavelengths in the visible spectrum. The wavelengths at which the two transmittances cross depends not only on the glass composition but also on the treating wavelength.

Measurement of the dichroic effects produced in the glass is typically accomplished utilizing a weak probing beam of visible light. Independent sensors are used to separately determine the transmittance of the glass as a function of wavelength with respect to two different components (parallel and perpendicular) of the probing beam. The transmittance of each component is conventionally defined as the ratio of its transmitted intensity $I$ to that of its incident intensity $I_o$.

The polarizing effectiveness of the glass at any particular wavelength is typically reported in terms of the observed polarization efficiency. Polarization efficiency (PE) as a percent is defined as:

$$PE = \frac{T_{11} - T_1}{T_{11} + T_1} \times 100$$

where $T_{11}$ is the transmittance of the glass at the particular wavelength with respect to that component of the probing light polarized parallel to the direction of polarization of the treating light, and $T_1$ is the transmittance with respect to that component of the probing light polarized perpendicularly thereto. PE depends on the thickness of the glass sample as well as on the total absorption characteristics of the glass.

We also report polarization effectiveness in terms of the dichroic ratio of the glass, a measure of anisotropy which is more nearly independent of the factors of thickness and total absorption. We define the dichroic ratio (R) of a colored glass as:

$$R = \frac{\ln(\frac{1}{T_1})}{\ln(\frac{1}{T_{11}})}$$

$T_1$ and $T_{11}$ being defined as hereinabove described. This definition of the dichroic ratio is particularly useful for comparing the polarizing properties of glasses over a wide range of fixed-tint levels.

The photo-dichroic and photo-coloration effects of optical treatments such as described above in Table IV upon various types of additively colored silver silver-halide glasses are reported for a number of glasses and treatments in Table V below. Each of the examples shown in Table V includes a composition designation for an additively colored glass, referring to the composition of the same designation shown in Table I; a description of the type of glass, including reference to the photochromic properties thereof, if any; a heat treatment designation referring to the heat treatment of the same designation shown in Table II used to precipitate a silver halide-containing phase in the glass; an ion-exchange interval for glasses of the silver-stained photochromic type, reporting the time in hours for which the glass was immersed in molten 36% $AgNO_3$-64% $KNO_3$ at 280° C. as hereinabove described; a second heat treatment designation, referring to the post-separation heat treatment of the same designation shown in Table III, used in some cases to develop or modify the additive coloration in the glass; and a qualitative description of the resulting additive color observed in the glass.

Following this description of the additively colored glass to be treated, Table V reports sample thickness for samples of each glass subjected to optical treatment; an optical treatment designation for each example, referring to the optical treatment of the same designation reported in Table IV, used to induce photo-alteration effects; a qualitative description of the color of the altered glass; and data describing the dichroism, if any, induced by the various optical treatments employed. This data includes the dichroic ratio (R), the transmittance (T), and the polarization efficiency (PE) as a percent for each of the treated glasses at two different measuring wavelengths: 550 nm and 625 nm.

TABLE V

Photo-Alteratin Effects in Additively Colored Glass

| Ex. No. | Composition No. (Table I) | Glass Type | Photochromic Properties | Phase Separation Treatment (Table II) | Ag+ Ion-Exchange Treatment Interval | Post-Separation Heat Treatment (Table III) | Additive Color |
|---|---|---|---|---|---|---|---|
| 1 | 1 | phase separable borosilicate | None | F | — | — | yellow |
| 2 | 1 | " | " | F | — | — | Yellow |
| 3 | 2 | " | " | C | — | — | Green |
| 4 | 2 | " | " | B | — | — | Blue |
| 5 | 2 | " | " | C | — | — | Green |
| 6 | 3 | silver stainable photochromic | Photochromic | J | 196 hours | — | Red |
| 7 | 3 | " | " | J | 196 hours | — | Red |
| 8 | 3 | " | " | J | 196 hours | — | Red |
| 9 | 4 | " | " | L | 96 hours | — | Purple |
| 10 | 4 | " | " | L | 96 hours | A | Orange |
| 11 | 4 | " | " | L | 96 hours | C | Red |

| Example No. | Sample Thickness | Optical Treatment (Table IV) | Altered Color | 550 nm R | 550 nm T | 550 nm PE | 625 nm R | 625 nm T | 625 nm PE |
|---|---|---|---|---|---|---|---|---|---|
| 1 cont'd. | 6 mm | S | Green | 1.31 | 47.8 | 9.7 | 1.86 | 37.3 | 30.2 |
| 2 " | 6 mm | D | Green | — | — | — | — | — | — |
| 3 " | 1 cm | E | Red | | | | | | |
| 4 " | 1 cm | R | Red | 0.97 | 13.1 | 3.4 | 1.33 | 52.8 | 9.0 |
| 5 " | 1 cm | R | Red | 0.95 | 19.3 | 4.1 | 1.43 | 36.0 | 18.1 |
| 6 " | 2 mm | F | Yellow | — | — | — | — | — | — |
| 7 " | 2 mm | G | Green | — | — | — | — | — | — |
| 8 " | 2 mm | H | Blue | — | — | — | — | — | — |
| 9 " | 2 mm | M | Purple | 1.40 | 5.0 | 20.0 | 1.39 | 20.3 | 25.9 |
| 10 " | 2 mm | M | Orange | 1.76 | 1.1 | 90.5 | 2.33 | 15.5 | 71.0 |
| 11 " | 2 mm | M | Red | 1.49 | 12.5 | 40.0 | 2.14 | 30.6 | 43.8 |

| Ex. No. | Composition No. (Table I) | Glass Type | Photochromic Properties | Phase Separation Treatment (Table II) | Ag+ Ion-Exchange Treatment Interval | Post-Separation Heat Treatment (Table III) | Additive Color |
|---|---|---|---|---|---|---|---|
| 12 | 4 | silver stainable photochormic | Photochromic | L | 96 hours | — | Purple |
| 13 | 4 | " | " | L | 96 hours | — | Purple |
| 14 | 5 | " | " | G | 16 hours | — | Green |
| 15 | 5 | " | " | G | 16 hours | — | Green |

| Example No. | Sample Thickness | Optical Treatment (Table IV) | Altered Color | 550 nm R | 550 nm T | 550 nm PE | 625 nm R | 625 nm T | 625 nm PE |
|---|---|---|---|---|---|---|---|---|---|
| 12 cont'd. | 2 mm | U | Purple | 1.04 | 3.8 | 6.7 | 1.00 | 11.0 | 0 |
| 13 " | 2 mm | X | Purple | 1.20 | 5.4 | 25.9 | 1.09 | 9.8 | 10.2 |
| 14 " | 2 mm | K | Rose | 1.12 | 14.5 | 10.7 | 1.20 | 15.3 | 17.6 |
| 15 " | 2 mm | L | Green | 1.28 | 13.9 | 24.2 | 1.16 | 8.9 | 18.0 |

| Ex. No. | Composition No. (Table I) | Glass Type | Photochromic Properties | Phase Separation Treatment (Table II) | Ag+ Ion-Exchange Treatment Interval | Post-Separation Heat Treatment (Table III) | Additive Color |
|---|---|---|---|---|---|---|---|
| 16 | 6 | silver stainable photochromic | Photochromic | H | 16 hours | — | Blue |
| 17 | 6 | " | " | H | 16 hours | — | Red |
| 18 | 6 | " | " | D | 96 hours | — | Orange |
| 19 | 6 | " | " | E | 96 hours | — | Red |
| 20 | 6 | " | " | E | 96 hours | — | Red |
| 21 | 6 | " | " | I | 96 hours | — | Magenta |
| 22 | 6 | " | " | I | 96 hours | — | Magenta |
| 23 | 6 | " | " | K | 96 hours | — | Green |

TABLE V-continued

Photo-Alteratin Effects in Additively Colored Glass

| Ex. No. | Composition No. (Table I) | Glass Type | Photochromic Properties | Phase Separation Treatment (Table II) | Ag+ Ion-Exchange Treatment Interval | Post-Separation Heat Treatment (Table III) | Additive Color |
|---|---|---|---|---|---|---|---|
| 24 | 6 | " | " | K | 96 hours | — | Green |

| Example No. | Sample Thickness | Optical Treatment (Table IV) | Altered Color | 550 nm R | 550 nm T | 550 nm PE | 625 nm R | 625 nm T | 625 nm PE |
|---|---|---|---|---|---|---|---|---|---|
| 16 cont'd. | 2 mm | J | Orange | 1.30 | 13.3 | 26.3 | 1.53 | 17.8 | 36.0 |
| 17 " | " | AA | Green | 1.32 | 17.5 | 23.9 | 1.15 | 7.9 | 17.7 |
| 18 " | " | V | Orange | 1.05 | 3.5 | 7.2 | 1.12 | 25.0 | 16.0 |
| 19 " | " | V | Magenta | 1.18 | 6.5 | 23.0 | 1.20 | 16.0 | 16.9 |
| 20 " | " | J | Magenta | 1.09 | 6.2 | 12.9 | 1.14 | 36.8 | 14.7 |
| 21 " | " | V | Green | 1.69 | 27.3 | 33.6 | 1.6 | 16.5 | 39.4 |
| 22 " | " | J | Magenta | 1.14 | 19.1 | 11.5 | 1.49 | 28.9 | 24.8 |
| 23 " | " | V | Green | 1.52 | 28.7 | 32.6 | 1.49 | 20.1 | 29.4 |
| 24 " | " | J | Rose | 1.07 | 25.7 | 5.1 | 1.29 | 29.6 | 15.4 |

| Ex. No. | Composition No. (Table I) | Glass Type | Photochromic Properties | Phase Separation Treatment (Table II) | Ag+ Ion-Exchange Treatment Interval | Post-Separation Heat Treatment (Table III) | Additive Color |
|---|---|---|---|---|---|---|---|
| 25 | 7 | thermally darkenable photochromic | Photochromic | L | — | — | Red-Brown |
| 26 | 7 | " | " | L | — | — | Red-Brown |
| 27 | 7 | " | " | L | — | — | Red-Brown |
| 28 | 8 | " | " | L | — | E | Red |
| 29 | 9 | " | " | L | — | E | Red |

| Example No. | Sample Thickness | Optical Treatment (Table IV) | Altered Color | 550 nm R | 550 nm T | 550 nm PE | 625 nm R | 625 nm T | 625 nm PE |
|---|---|---|---|---|---|---|---|---|---|
| 25 cont'd. | 2 mm | A | Red | — | — | — | — | — | — |
| 26 " | " | B | Green | — | — | — | — | — | — |
| 27 " | " | C | Blue | — | — | — | — | — | — |
| 28 " | " | Z | Green | 2.08 | 16.0 | 62.5 | 2.76 | 16.1 | 79.6 |
| 29 " | " | Z | Green | 3.72 | 15.0 | 93.3 | 2.69 | 11.3 | 86.7 |

| Ex. No. | Compositon No. (Table I) | Glass Type | Photochromic Properties | Phase Separation Treatment (Table II) | Ag+ Ion-Exchange Treatment Interval | Post-Separation Heat Treatment (Table III) | Additive Color |
|---|---|---|---|---|---|---|---|
| 30 | 10 | thermally darkenable photochromic | Photochromic | L | — | G | Red |
| 31 | 10 | " | " | L | — | D | Red |
| 32 | 10 | " | " | L | — | B | Red |
| 33 | 11 | " | " | I | — | F | Brown |
| 34 | 12 | reduced silver halide | slightly photochromic | A | — | — | Purple |
| 35 | 13 | " | " | A | — | — | Red |
| 36 | 13 | " | " | A | — | — | Red |
| 37 | 13 | " | " | A | — | — | Red |
| 38 | 15 | " | " | A | — | — | Red |
| 39 | 16 | " | — | M | — | — | Red-Orange |
| 40 | 16 | " | " | M | — | — | Red-Orange |
| 41 | 14 | " | " | A | — | — | Red |

| Example No. | Sample Thickness | Optical Treatment (Table IV) | Altered Color | 550 nm R | 550 nm T | 550 nm PE | 625 mn R | 625 mn T | 625 mn PE |
|---|---|---|---|---|---|---|---|---|---|
| 30 cont'd. | 2 mm | CC | Cyan | 3.25 | 7.5 | 97.3 | 2.68 | 4.0 | 97.4 |
| 31 " | " | CC | Cyan | 2.91 | 14.6 | 84.9 | 3.15 | 11.3 | 92.9 |
| 32 " | " | CC | Orange | 1.92 | 23.5 | 45.8 | 2.31 | 29.3 | 49.5 |
| 33 " | " | I | yellow | 1.26 | 43.2 | 9.8 | 1.24 | 55.9 | 6.2 |
| 34 " | " | EE | Blue | 1.92 | 24.4 | 44.6 | 2.16 | 22.7 | 54.2 |
| 35 " | " | T | Red | 1.31 | 14.4 | 26.3 | 1.51 | 30.6 | 24.0 |
| 36 " | " | Y | Magenta | 1.97 | 19.4 | 52.7 | 2.47 | 25.6 | 58.9 |
| 37 " | " | W | Blue | 1.89 | 19.3 | 50.3 | 2.32 | 23.0 | 58.7 |
| 38 " | " | L | Orange | 1.51 | 17.4 | 35.1 | 2.24 | 44.2 | 32.1 |
| 39 " | 1 mm | O | Orange | 2.07 | 14.3 | 64.9 | 2.62 | 31.8 | 52.8 |
| 40 " | 1 mm | CC | Cyan | 2.42 | 18.8 | 67.6 | 1.70 | 2.5 | 80.0 |
| 41 " | 2 mm | DD | Magenta | 1.44 | 15.4 | 33.6 | 1.81 | 26.2 | 38.8 |

From the foregoing examples it will be apparent that many variations in the methods hereinabove described may be employed to induce color-modifying and polarizing changes in light absorption in an extremely wide variety of additively colored glasses comprising interacting metallic silver and silver halide phases. For example, information storage applications might involve the use of glass articles comprising two or more volume regions of differing color and/or light polarizing properties, provided by irradiating one or more of the regions with differently colored or polarized light. Obviously, regions of varying polarizations cannot practically be provided by prior art stretching processes. Similarly, prior art methods for producing multi-colored glass articles which utilize a heat treating step for color development cannot produce colored regions of arbitrary pattern, which are also alterable at will by further irradiation with colored light.

As previously noted, the mechanism by which optical anisotropy and coloring shifts are induced in these colored glasses has not been completely established. It is presently believed, however, that the additive coloration effects observed in these glasses are due to the precipitation of somewhat non-spherical colloids of silver arranged with random orientations within the silver halide particles or at the silver halide particle-to-glass interface. Strong absorption of light and optical alteration are apparently accomplished when the electric vector of the treating light is parallel to the long axis of the colloid. Hence, if polarized treating light is used, the array of silver colloids will no longer be random in direction and a polarizing material will result.

It is presumed that, in addition to the randomness of the orientation of the elongated colloids of silver, there also exists a distribution of elongation ratios. The distribution varies from glass to glass and with the techniques used to produce the metallic silver coloration. The wavelength of light which is most strongly absorbed varies with the degree of asymmetry of the silver colloid doing the absorption. Therefore it is not surprising that the wavelength of treating light which leads to optimum alteration effects varies somewhat depending on the glass.

Although the largest alteration effects have been produced using long or intermediate wavelength sources of treating light, it is known that some absorption of light whose electric vector is perpendicular to the long axis of the colloid occurs at short wavelengths. Such wavelengths can therefore be expected to also cause optical alteration and polarization.

We have found that the effects hereinabove described are widespread in the sense that they are observed in both photochromic and non-photochromic glasses containing silver halides, as well as in all varieties of host glasses that we have studied. Of course, the degree of the effect varies widely with the composition, size, and defect structures of the silver halide crystallites themselves, and the quantity, size, shape, and manner of distribution of the metallic silver colloids. Nevertheless, the nature of the host glass does not seem to be a limitation on the dichroic ratio or coloring shift produced, provided the base glass allows the precipitation of a combination of silver-silver halide phases having suitable optical sensitivity. By way of illustration, we point out that good dichroic ratios have been observed in several silicate systems as well as in glasses which are primarily composed of other oxides.

Unfortunately, because of the small size of the aggregates involved, the direct observation of the coloring metallic silver phase in contact with or within the silver halide phase is extremely difficult and may well be impossible. The particles constituting or comprising the silver halide phase are generally a few hundred angstroms in diameter, or less. The metallic silver colloid particles would be expected to be even smaller than this. Nevertheless, the fact that these effects have not been observed in silver-containing glasses except where a silver halide phase has also been provided supports the view that a silver halide-activated metallic silver phase is responsible for the results hereinabove described.

We claim:

1. A method for producing a colored, dichroic birefringent glass article which comprises the steps of selecting an additively colored silver-silver halide containing glass article comprising metallic silver and silver halide phases and irradiating at least a selected region of the selected glass article with polarized light.

2. A method according to claim 1 wherein the silver halide phase of the additively colored silver-silver halide containing glass article includes silver chloride.

3. A method according to claim 1 wherein the silver halide phase of the additively colored silver-silver halide containing glass article includes silver bromide.

4. A method according to claim 1 wherein the silver halide phase of the additively colored silver-silver halide containing glass includes silver iodide.

5. A method according to claim 1 wherein the additively colored silver-silver halide containing glass article is composed of a phase-separated borosilicate glass.

6. A method according to claim 1 wherein the additively colored silver-silver halide containing glass article is composed of a thermally darkenable photochromic glass.

7. A method according to claim 1 wherein the additively colored silver-silver halide containing glass article is composed of a silver-stained photochromic glass.

8. A method according to claim 1 wherein the additively colored silver-silver halide containing glass article is composed of a reduced silver halide containing glass.

9. A method according to claim 1 wherein the polarized light is polarized laser light.

10. A dichroic and birefringent additively colored silver-silver halide containing glass article comprising metallic silver and silver halide phases, wherein the particles comprising the silver halide phase are not preferentially oriented.

11. An additively colored silver-silver halide containing glass article comprising metallic silver and silver halide phases which includes at least two volume regions exhibiting differing light polarizing properties, said article being produced by irradiating at least one of said volume regions with linearly polarized light.

12. A method for modifying the color of an additively colored silver-silver halide containing glass article comprising metallic silver and silver halide phases which comprises the step of irradiating at least a selected region of the additively colored glass article with colored light.

13. A method according to claim 12 wherein the silver halide phase of the additively colored silver-silver halide containing article includes silver chloride.

14. A method according to claim 12 wherein the silver halide phase of the additively colored silver-silver halide containing article includes silver bromide.

15. A method according to claim 12 wherein the silver halide phase of the additively colored silver-silver halide containing article includes silver iodide.

16. An additively colored silver-silver halide containing glass article comprising metallic silver and silver halide phases which includes at least two volume regions of arbitrary pattern exhibiting differing colors, said article being produced by irradiating at least one of said volume regions with colored light, and the color of each of said regions being alterable by further irradiation with colored light.

* * * * *

UNITED STATES PATENT AND TRADEMARK OFFICE
CERTIFICATE OF CORRECTION

PATENT NO. : 4,125,405                          Page 1 of 2

DATED : November 14, 1978

INVENTOR(S) : Roger J. Araujo, Nicholas F. Borrelli, Jan B. Chodak, George B. Hares, Gerald S. Meiling, and Thomas P. Seward, III It is certified that error appears in the above-identified patent and that said Letters Patent are hereby corrected as shown below:

Column 8, line 17, "$T_1$)." should be -- $T_1$). --.

Column 8, line 24, "$T_1$)" should be -- $T_1$) --.

Column 8, line 32, "$T_1$)" should be -- $T_1$) --.

Columns 9 and 10, Table I, line 2, "glasse)" should be -- glasses --.

Columns 11 and 12, Table I-continued, constituent Cl, Examples 5-16, delete present line and insert -- 0.48   0.68   0.48   0.24   0.60   0.26   3.92   0.45   0.47   0.59   1.05   0.95 -- therefor.

Columns 11 and 12, Table I-continued, delete "0.48" between constituents Cl and Br.

Column 16, lines 12-15, in the formula, "$T_1$", both occurrences, should be -- $T_1$ --.

Column 16, line 59, "$T_1$" should be -- $T_1$ --.

Column 17, lines 1-4, in the formula, "$T_1$" should be -- $T_1$ --.

UNITED STATES PATENT AND TRADEMARK OFFICE
CERTIFICATE OF CORRECTION

PATENT NO. : 4,125,405

DATED : November 14, 1978

INVENTOR(S) : Roger J. Araujo, Nicholas F. Borrelli, Jan B. Chodak, George B. Hares, Gerald S. Meiling, Thomas P. Seward, III It is certified that error appears in the above-identified patent and that said Letters Patent are hereby corrected as shown below:

Column 17, line 7, "$T_1$" should be -- $T_1$ --.

Columns 19 and 20, Table V-continued, Example 21, under "R" second occurrence, "1.6" should be -- 1.56 --.

Columns 19 and 20, Table V-continued, Example 32, under "R" second occurrence, "3.15" should be -- 3.16 --.

Signed and Sealed this

Seventh Day of August 1979

[SEAL]

Attest:

Attesting Officer

LUTRELLE F. PARKER

Acting Commissioner of Patents and Trademarks